Sept. 12, 1961 J. C. JACKSON 2,999,450
COMBINATION COOKING APPARATUS
Filed July 25, 1960 5 Sheets-Sheet 2
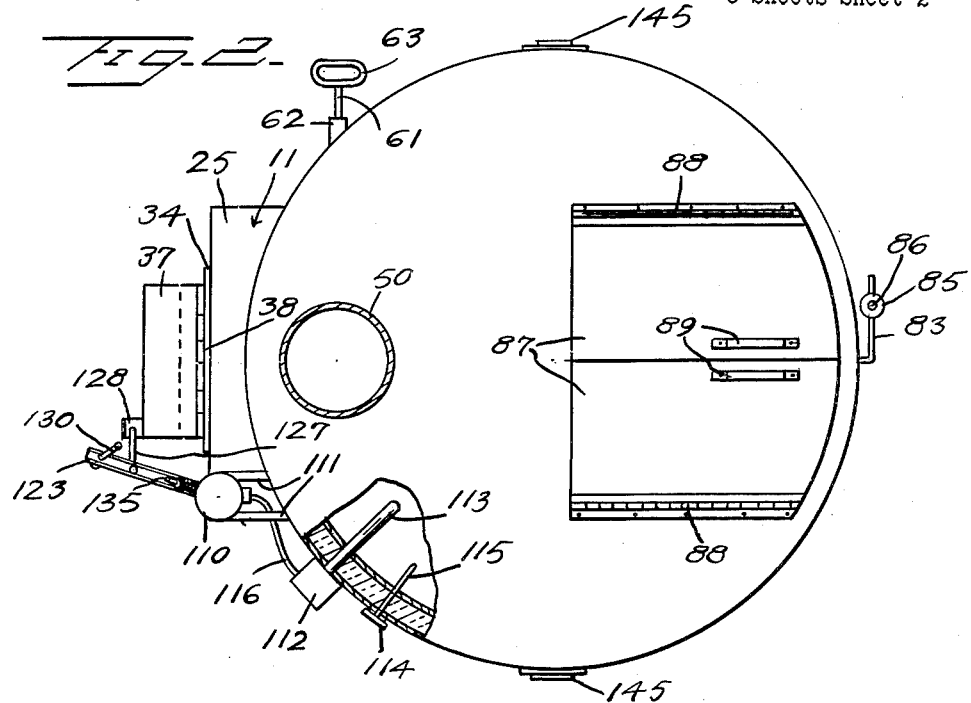
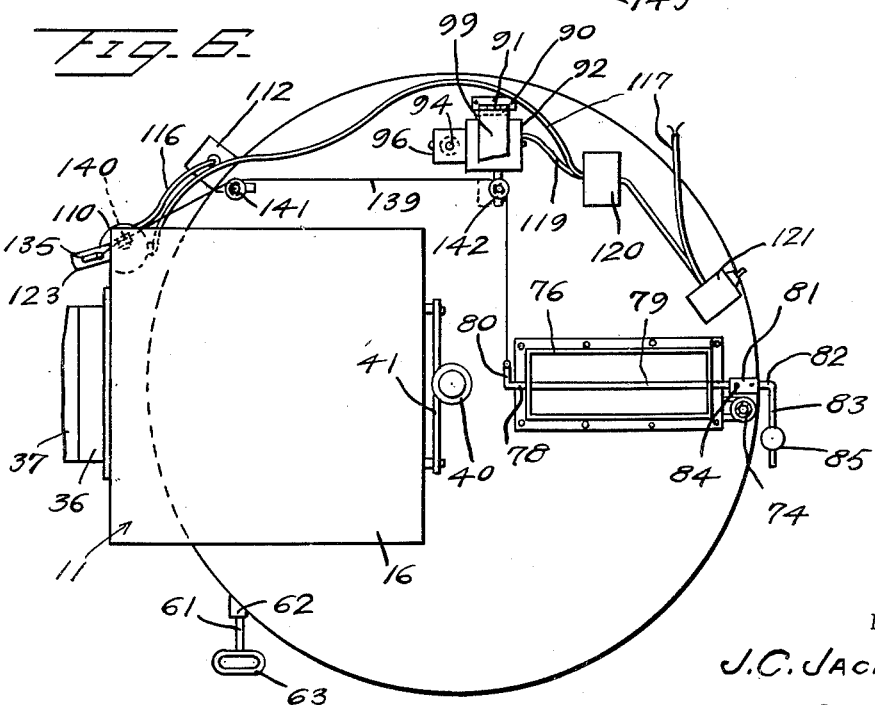
INVENTOR
J. C. JACKSON
BY John N. Randolph
ATTORNEY Sept. 12, 1961  J. C. JACKSON  2,999,450
COMBINATION COOKING APPARATUS
Filed July 25, 1960  5 Sheets-Sheet 3
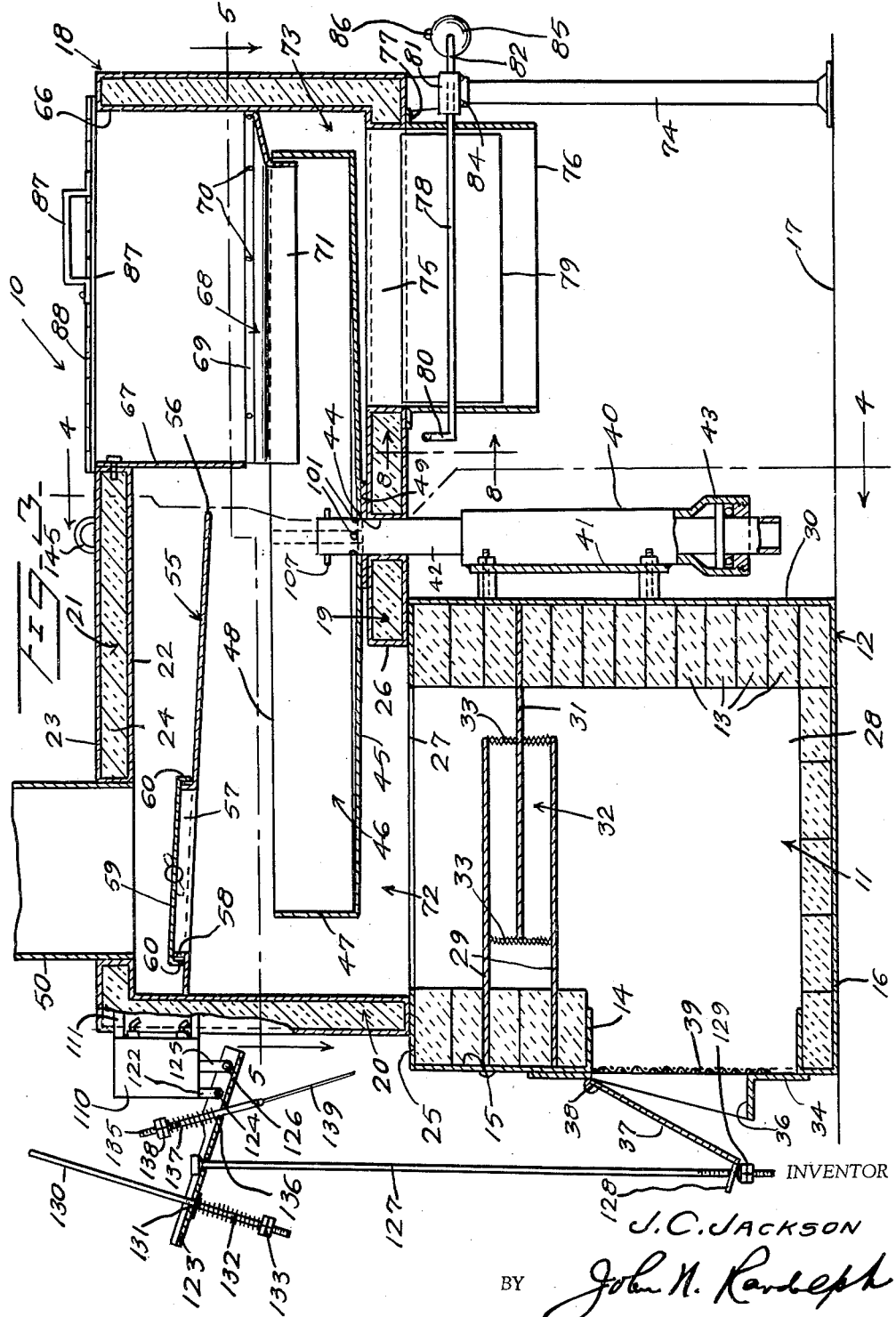
INVENTOR
J.C. JACKSON
BY John N. Randolph
ATTORNEY

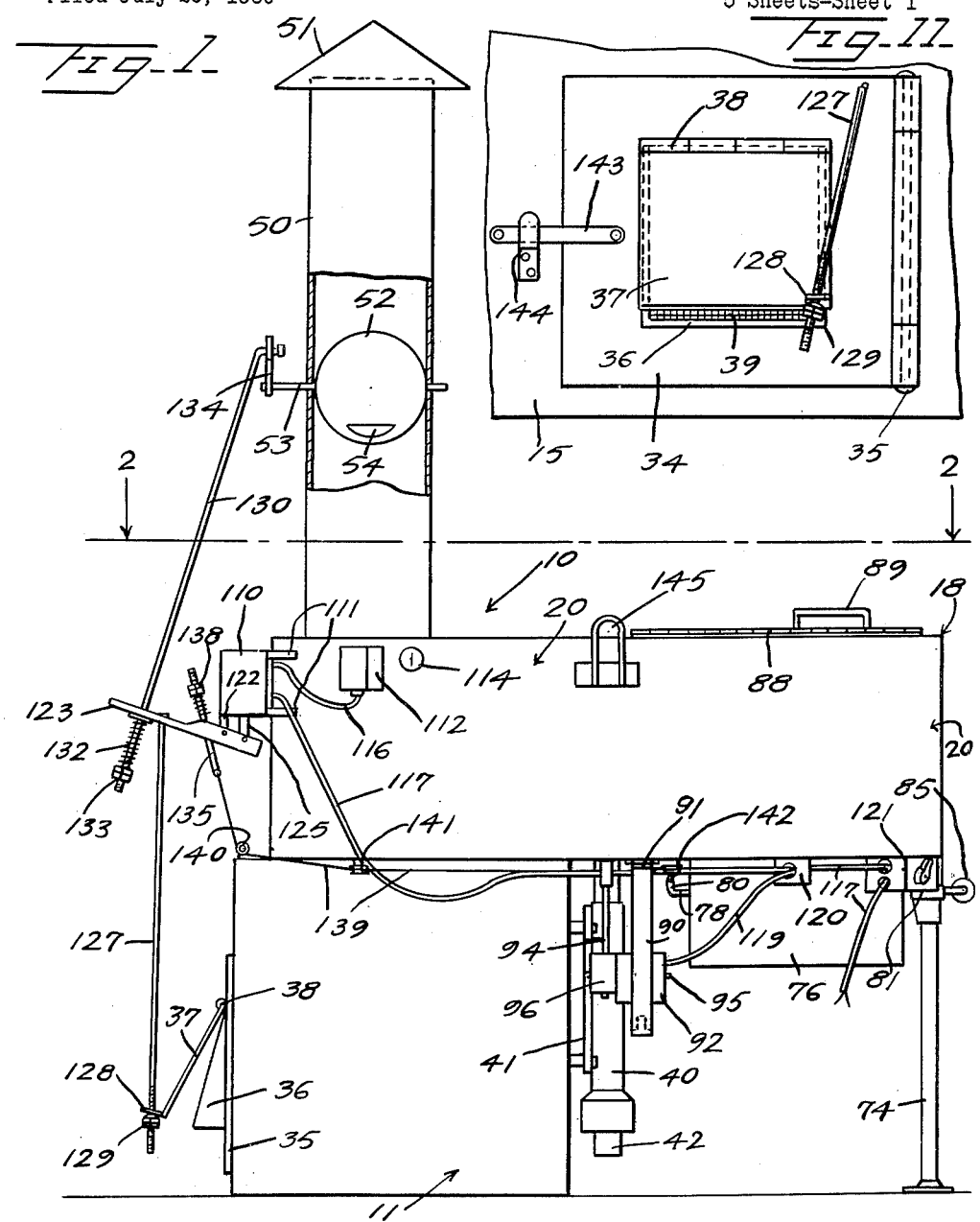

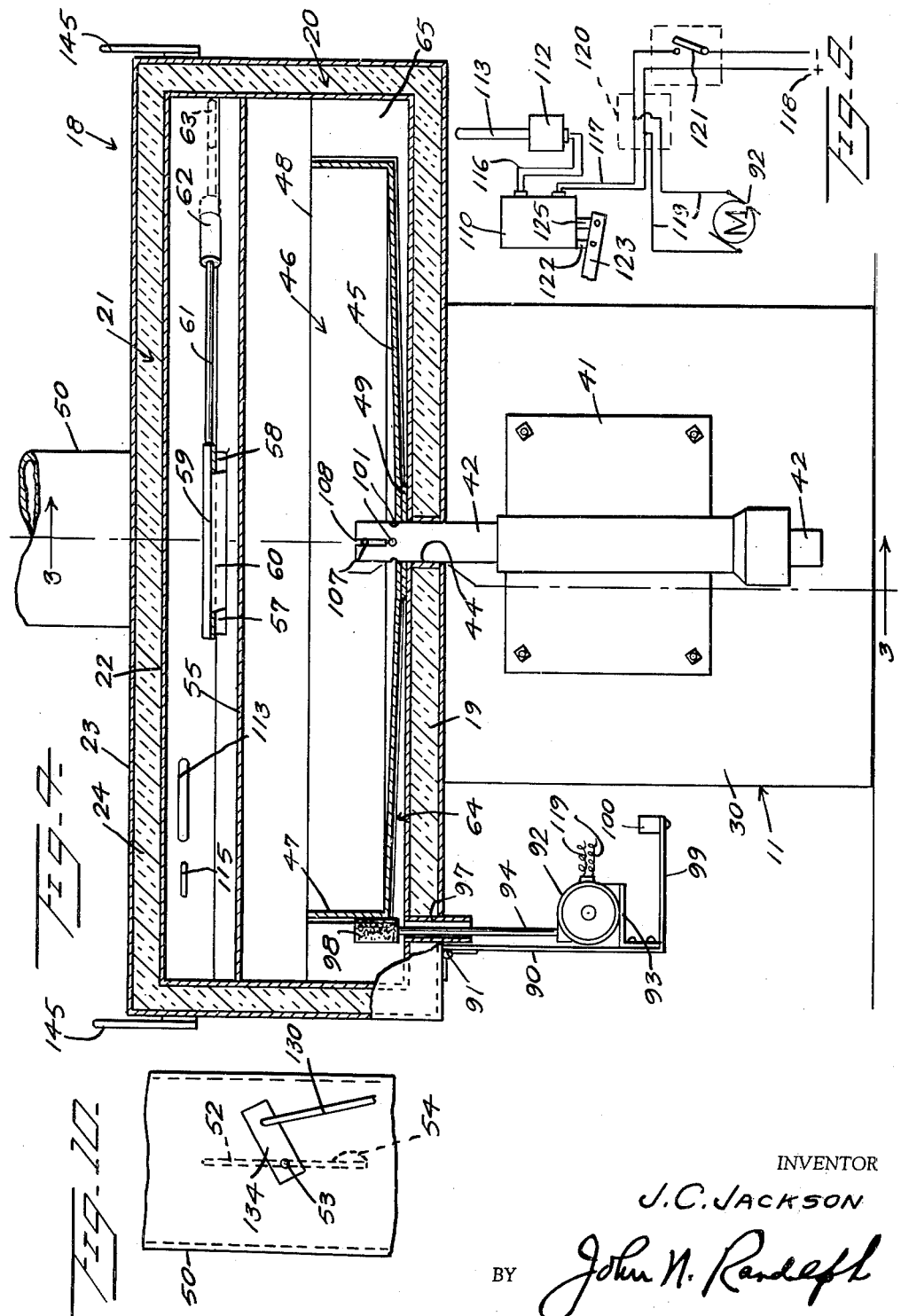

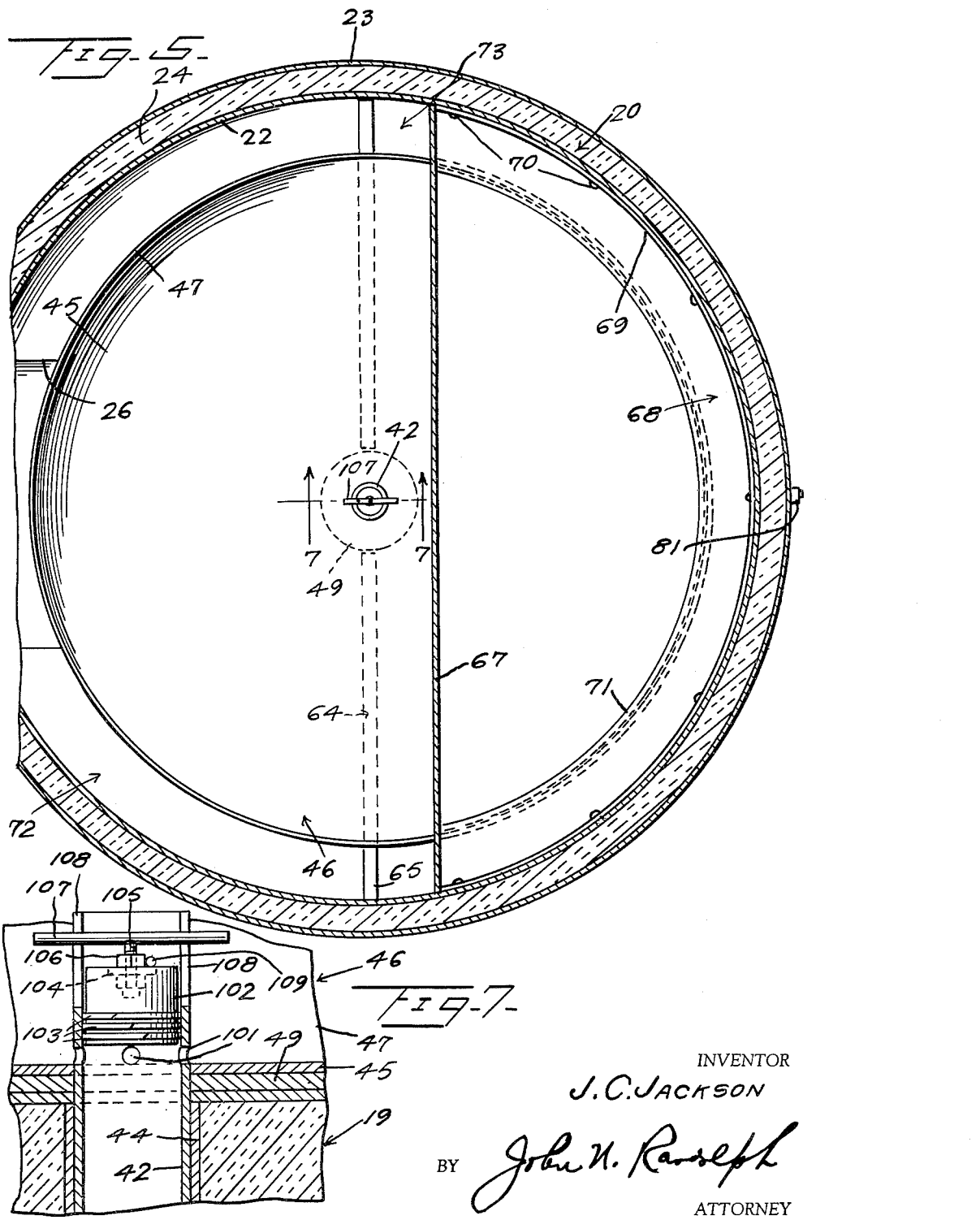

United States Patent Office 2,999,450
Patented Sept. 12, 1961

2,999,450
COMBINATION COOKING APPARATUS
James C. Jackson, 1331 Pendleton St., Columbia, S.C.
Filed July 25, 1960, Ser. No. 44,996
11 Claims. (Cl. 99—262)

This invention relates to a novel apparatus or machine primarily adapted for barbecuing meats, including fowl, and which is also capable of being utilized for frying.

A primary object of the present invention is to provide a machine of simple construction which may be employed for cooking large quantities of meat simultaneously and, if employed as a barbecuer, for impregnating the meat with the smoke from the fuel, either hickory or oak wood or charcoal, to produce barbecued flavor in the cooked meat.

Another object of the invention is to provide an apparatus or machine having automatically controlled damper means for regulating the cooking temperature and which will effectively function to prevent the meat being cooked too fast, burnt, or caused to catch fire.

Another object of the invention is to provide a cooking apparatus requiring little or no supervision due to its automatic controls and which is so constructed that all of a large quantity of meat being cooked will be subjected to uniform heat and cooking during the cooking period.

Various other objects and advantages of the invention will hereinafter become more fully apparent from the following description of the drawings, illustrating a presently preferred embodiment thereof, and wherein:

FIGURE 1 is a side elevational view, partly in vertical section, of the combination cooker;

FIGURE 2 is a horizontal sectional view, partly broken away, on a reduced scale, taken substantially along a plane as indicated by the line 2—2 of FIGURE 1;

FIGURE 3 is an enlarged fragmentary vertical sectional view, partly in elevation, taken from front to rear of the cooker;

FIGURE 4 is a transverse vertical sectional view, partially in elevation, taken substantially along the line 4—4 of FIGURE 3;

FIGURE 5 is a fragmentary horizontal sectional view, taken substantially along the line 5—5 of FIGURE 3;

FIGURE 6 is a fragmentary bottom plan view, on a reduced scale, of the cooker;

FIGURE 7 is an enlarged fragmentary vertical sectional view, taken substantially along a plane as indicated by the line 7—7 of FIGURE 5;

FIGURE 8 is a fragmentary vertical sectional view, taken substantially along a plane as indicated by the line 8—8 of FIGURE 3;

FIGURE 9 is a diagrammatic view illustrating the electric circuit of the apparatus;

FIGURE 10 is a fragmentary front elevational view of a portion of the smokestack, and FIGURE 11 is a fragmentary front elevational view of the furnace.

Referring more specifically to the drawings, the combination cooking apparatus or machine in its entirety is designated generally 10 and includes a furnace, designated generally 11, having a metal shell 12 which is lined with firebrick or the like 13 except for an opening 14 in the front wall 15 of said shell. A substantially flat bottom 16 of the shell 12 is adapted to rest on any suitable supporting surface 17.

The combination cooker 10 also includes a large cylindrical casing 18 including a bottom wall 19, cylindrical side wall 20 and top wall 21, each of which is composed of an inner metal section 22, an outer metal jacket 23 and a relatively thick layer of a heat insulating material 24 interposed between the plies 22 and 23. A portion of the bottom 19, disposed between a part of the cylindrical wall 20 and the center of said bottom, rests upon and is secured to the top 25 of the furnace 11. Said bottom portion has a large opening 26 disposed in registration with a large opening 27 of the top of the furnace.

The bottom portion of the furnace 11, with which the front wall opening 14 communicates, constitutes a fire pot 28. Two baffle members 29 are secured to the front wall 15 and extend to a point spaced from the rear wall 30, and a single baffle member 31 is supported by and extends from rear wall 30 to a point spaced from the front wall 15 and has an inner portion disposed between and spaced from inner portions of the baffles 29 to form a flue 32, which is located between the fire pot 28 and the open top 27 of the furnace. The flue 32 is preferably provided with expanded metal sheets 33 covering the ends thereof and forming spark arresters.

The front furnace wall 15 is provided with a door 34 which is vertically hinged at 35, as seen in FIGURE 11, for closing the opening 14 and which is provided with an externally flanged damper opening 36 capable of being closed by a damper 37 which is hinged at its upper edge, as seen at 38. A mesh wire fabric or expanded metal screen 39 covers the inner side of the opening 36 to prevent pieces of fuel, not shown, contained within the fire pot 28 from obstructing and preventing closing of the damper 37.

A bearing housing 40 is supported behind the furnace 11 by a bracket 41 which is secured to the rear furnace wall 30. The bearing housing 40 is disposed in an upright position beneath and spaced from the casing bottom 19 to provide a journal for a hollow shaft 42 which is journalled therein and supported by antifriction and thrust bearing means 43, contained within the housing 40. The upper portion of the hollow shaft 42 extends upwardly through and is turnably mounted in an opening 44 of the casing bottom 19. The hollow shaft 42 extends upwardly from the casing bottom 19, centrally through a bottom 45 of a large pan 46 which also includes an upstanding cylindrical rim 47, the upper edge of which defines the open top 48 of said pan. The central portion of the pan bottom 45 is secured immovably around the hollow shaft 42, as by means of a spacing collar 49 which is secured around the shaft 42 and to the underside of the central portion of the bottom 45, so that the pan 46 is supported by the shaft 42 for rotation therewith within the lower part of the casing 18. The pan 46 is of sufficient diameter so that a substantial part of the bottom 45 thereof is disposed over the casing opening 26 and over the open top 27 of the furnace, and the open top 48 of the pan is spaced a substantial distance from the casing top wall 21.

A smokestack 50 is supported by and extends upwardly from a part of the top wall 21 and opens downwardly therethrough, above and in vertical alignment with the furnace 11. The smokestack 50 may be provided with a conventional cap or shield 51 at its upper end, as seen in FIGURE 1, and said smokestack also includes a damper 52 mounted on a shaft 53, which is journaled in the smokestack. The damper 52 has a weight 54 secured to a part thereof for normally maintaining the damper in an open position, as seen in FIGURE 1. A baffle 55 is secured within the casing 18 between the smokestack 50 and a part of the pan 46, located therebeneath, and said baffle is disposed over somewhat more than one-half of the interior of the casing 18 and over more than a half of the pan 46. The baffle 55 has a slight downward slope toward its inner edge 56. The baffle 55 is provided with a rectangular opening 57 located beneath the stack 50 and having upstanding flanges 58. A damper 59 normally closes the opening 57 and has side edges provided with downturned flanges 60 which embrace and slidably engage two of the parallel flanges 58 to provide means for slidably guiding the damper 59. As seen in FIGURE 4, a rod 61 is fixed to and extends from one end of the damper 59 and slidably through a guide sleeve 62 which is secured in and extends through a part of the wall 20, said damper rod 61 having a handle 63 which is disposed externally of the casing 18. The spacing between the guide sleeve 62 and the opening 57 is such that the damper 59 will abut the inner end of the sleeve 62 before the flanges 60 thereof disengage the flanges 58 to maintain the damper in slidable engagement with and guided by the flanges 58 in its open position as well as its closed position.

A partition 64 extends crosswise of the interior of the casing 18 along the underside of the pan bottom 45 and includes upstanding end portions 65 which are disposed between portions of the pan rim 47 and parts of the cylindrical wall 20. Said end portions 65 terminate at approximately the level of the upper edge of the rim 47, and the partition 64 is located approximately beneath and substantially parallel to the lower inner end 56 to the baffle 55, and thus crosswise to the machine 10. The part of the top wall 21, located remote from the stack 50, is provided with a large access opening 66. A partition member 67 is secured to the top casing wall 21 and extends downwardly therefrom. The bottom edge of the partition 67 terminates slightly above the open top 48 of the pan 46, and said partition member extends completely across the casing 18, as seen in FIGURE 5, and is spaced a short distance from the inner end 56 of the baffle 55, as seen in FIGURE 3. An apron or shield 68 has an upper edge 69 secured by fastenings 70 to the inner side of the wall 20 at approximately the level of the bottom edge of the partition 67, and said shield or apron 68 extends around the portion of the casing 18 which is located remote from the furnace 11 and has its ends terminating at the partition 67. The apron or shield 68 extends inwardly and downwardly from its secured upper edge 69 over a portion of the rim 47 and has a depending inner and bottom edge 71 which is disposed within a part of the top portion of the pan 46, as clearly illustrated in FIGURE 3; said shield 68 being supported entirely by the wall 20 and having no contact with the pan rim 47 but being disposed in close proximity to a part of the upper portion thereof.

The partition 64 combines with the partition 67 and shield 68 to divide the casing 18 into a heating compartment 72, which is disposed above the furnace 11, and a cold air compartment 73, which is disposed remote from the furnace 11 and on the opposite sides of the partitions 64 and 67 to said hot air compartment 72.

A single supporting leg 74 is fixed to and extends downwardly from a part of the casing bottom 19, located remote from the furnace 11, and said leg likewise rests upon the surface 17 to combine with the furnace bottom 16 for supporting the machine 10.

The casing bottom 19 is provided with a large opening 75 disposed beneath the opening 66 and beneath a part of the pan bottom 45 and forming a cold air inlet to the chamber 73. A flue 76 is secured by fastenings 77 to the underside of the casing bottom 19, around the opening 75, and extends a short distance downwardly therefrom. A shaft 78 extends through and is journalled in the flue 76 and has a damper 79 fixed thereto and disposed within said flue. The shaft 78 is disposed crosswise to the furnace rear wall 30 and is provided at one end thereof with a crank arm 80, located between the flue 76 and said furnace wall 30. A sleeve 81 is secured to and projects from one end 82 of an arm having an opposite end 83 disposed at approximately a right angle to the end 82. The other end of the shaft 78 is received in the opposite end of the sleeve 81, externally of the flue 76, and is adjustably secured thereto by a setscrew 84 for locating the arm 82, 83 in a plane approximately at a right angle to the plane of the damper 79. A weight 85 is adjustably secured by setscrew 86 on the arm portion 83 for urging the damper 79 to a closed position.

A pair of doors 87, as best seen in FIGURE 2, are hinged at 88 at their remote edges to the upper side of the casing top wall 21, at opposite sides of the opening 66, so that said doors close the opening 66, in the closed position of the doors as illustrated in FIGURES 2 and 3. The doors 87 have handles 89 for swinging said doors upwardly and outwardly relative to one another to open positions for exposing the opening 66.

As best seen in FIGURE 4, a hanger bracket 90 is swingably connected by a hinge 91 to a portion of the underside 19 of the casing 18. An electric motor 92 is mounted on and secured to the hanger 90 by a bracket element 93. As best seen in FIGURE 1, one end of a shaft 94 is connected to the shaft 95 of the motor 92 by a reduction gear unit 96. The shaft 94 extends upwardly from the reduction gear unit 96 loosely through a sleeve 97, which forms an opening in the casing bottom 19, as seen in FIGURE 4. A friction drive wheel 98 is fixed to the upper end of the shaft 94 within the casing 18 and bears yieldably against a portion of the exterior of the pan rim 47. The hanger 90 has a horizontally extending arm 99 at its lower end which extends under the motor 92 and to which a weight 100 is connected. The weight 100 cooperates with the weight of the motor 92 for urging the hanger 90, and parts supported thereby, to swing clockwise about the axis of the hinge 91, as seen in FIGURE 4, for urging the friction wheel 98 against the pan rim 47 to insure that the pan will be revolved by rotation of said friction wheel. The periphery of the friction wheel 98 may provide a suitable traction surface of any construction to further insure against slippage of the friction wheel on the pan rim.

The hollow shaft 42, as best seen in FIGURES 3, 4 and 7, is provided with drainage openings 101 located at and just above the level of the upper side of the central portion of the pan bottom 45 for draining off grease and other liquids from the pan 46 and which flow by gravity toward the center of the slightly dished pan bottom 45. Any suitable receptacle not shown, may be placed beneath the lower end of the hollow shaft 42 for catching and collecting these drippings. As best seen in FIGURE 7, a sleeve valve 102 is slidably mounted in the upper portion of the hollow shaft 42 and is preferably provided with sealing rings 103. A plate 104 is secured in and spans the upper portion of the interior of the valve 102, and a threaded bolt 105 extends downwardly through the plate 104 and is adjustably secured thereto by nuts 106. A rod 107 forming a handle or crosshead is secured intermediate of its ends to the upper end of the bolt 105 and is disposed crosswise thereof. Portions of the rod 107 slidably engage in diametrically aligned longitudinally extending slots 108 which open outwardly of the upper end of the hollow shaft 42. The end portions of the handle 107, which are disposed externally of the shaft 42, will be manually engaged for moving the valve 102 downwardly from its open position of FIGURE 7 to a closed position covering the drain openings 101 to prevent liquids from draining through the shaft 42 from the pan 46, as for example, when the apparatus 10 is used for frying or while the pan is being cleaned. For barbecuing or roasting the valve 102 is disposed in its raised, open position of FIGURE 7 abutting a stop pin 109 which is mounted in and extends inwardly from an upper portion of the shaft 42. The valve 102 is made hollow to permit a circulation of air therethrough and through the shaft 42 to avoid excessive heating of said shaft and its bearing 43.

As best seen in FIGURES 1 and 2, an electric motor damper control 110 is supported by a bracket 111 which is secured to and extends outwardly from a part of the casing side wall 20, at the front of the machine 10. A thermostat 112 is mounted on said casing wall 20, near the top of the casing 18, and has a helical element 113 extending into the heating chamber 72 of the casing, above the baffle 55. The theromstat 112 is located adjacent the motor damper control 110 and a temperature gauge 114 is mounted on the exterior of the wall 20, adjacent the thermostat 112, and has a part 115 extending inwardly through said wall and which is likewise mounted in the heating compartment 72 and above the baffle 55. The thermostat 112 is of a conventional type manufactured by Minneapolis-Honeywell Regulator Company, identified as "La 419B Airstat." The motor damper control 110 is produced by the same concern for use with the thermostat 112 and bears the identification "M828-e." The thermostat 112 is connected to the motor damper control 110 by electric wiring 116 and the motor damper control 110 is connected by electric wiring 117, as best seen in FIGURE 9, to a source of electric current 118, such as any conventional electrical outlet. Branch conductors 119 leading from the electric motor 92 are connected with the wiring 117 at a junction box 120, and a make and break switch 121 is interposed in the wiring 117, between said junction box 120 and the current source 118, for simultaneously breaking the electric circuit to the motor 92, the motor damper control 110 and the thermostat 112.

A bracket 122, as seen in FIGURE 3, is fixed to and extends downwardly from a part of the motor damper control 110. An arm 123 is pivotally mounted, near one end thereof, by a pivot pin 124, on the lower end of the bracket 122. A rod 125 forms a part of the motor damper control 110 and extends downwardly therefrom. The lower end of the rod 125 is pivotally connected by a pivot pin 126 to the shorter end of the lever arm 123. A connecting rod 127 is swingably connected to and extends downwardly from the arm 123 on the other side of its pivot 124 and has a threaded lower end extending loosely through a lug 128 which extends outwardly from the lower free end of the damper 37. A nut 129 adjustably engages the rod 127 and bears against the underside of the lug 128. A connecting rod 130 extends loosely through an opening 131 of the arm 123 and is disposed outwardly with respect to the upper end of the connecting rod 127. A cushioning spring 132 is adjustably retained on the rod 130 by nuts 133 and yieldably bears beneath the lever arm 123. The upper end of the connecting rod 130, as seen in FIGURES 1 and 10, is pivotally connected to one end of a lever element 134, the other end of which is fixed to the forward end of the damper shaft 53. The lever element 134 extends upwardly at an angle from the damper shaft 53 when the damper 52 is held in its normal open position by the weight 54. A rod 135 extends loosely through an opening 136 formed in the lever arm 123, between the connecting rod 127 and pivot 124. The rod 135 is provided with a cushioning spring 137 which bears on the upper side of the arm 123 and which is held under tension by nuts 138, carried by the upper portion of the rod 135. One end of a cable 139 is secured to the lower end of the rod 135, below the arm 123, and said cable extends downwardly therefrom under a pulley 140, which is secured to the top 25 of the furnace 11, and then over pulleys 141 and 142, as seen in FIGURES 1 and 6, and with the opposite end of the cable 139 connected to the crankarm 80. The pulleys 141 and 142 are supported by and disposed beneath the casing bottom 19.

The furnace door 34 has a conventional latch 143 which can be disengaged from a keeper 144, carried by the front wall 15, for opening the door 34 for applying fuel to the fire pot 28. The fuel employed, not shown, may comprise hickory or oak wood or charcoal and is placed in the bottom of the fire pot 28, which is not equipped with grates, so that the fuel, or a substantial part thereof, will be disposed below the damper opening 36. The damper control arm 123 is normally maintained in its position of FIGURE 3 by the rod 125 of the motor damper control 110 for supporting the damper 37 in an open position and also for maintaining the damper 79 in an open position, while permitting the weight 54 to maintain the damper 52 in an open position. The furnace is lighted in any conventional manner and the air supplied thereto through the damper opening 36 will pass over the fuel to cause the fuel to burn slowly. The heat and products of combustion will pass upwardly from the fire pot 28 through the flue 32 and through the open top of the furnace 27 into the heating compartment 72 of the casing 18. It will be understood that the switch 121 will be closed so that the motor damper control 110, thermostat 112 and motor 92 will be energized. Accordingly, the pan 46 will be revolved by engagement of the friction wheel 98 with the pan rim 47 for turning the pan 46 very slowly so that all portions thereof will move through the heating compartment 72 and also through the cold air compartment 73, during each revolution of the pan, in order that all parts of the pan will be substantially uniformly heated and no part of the pan will be heated to too great an extent. The doors 87 are opened for loading the pan 46 through the opening 66 with the meat or other products, not shown, to be cooked, and which can be accomplished while the pan is being revolved. The pan preferably revolves at a very slow speed, approximately one revolution every three minutes, so that the meat or other food can be readily applied to the pan as it is revolved or removed therefrom while the pan is turning. The extent of cooking the contents of the pan 46 can also be observed by opening one or both of the doors 87.

For roasting or barbecuing, the damper 59 is closed so that the heat and smoke after passing a part of the pan bottom 45 located in the heating chamber 72 passes up and over the pan rim and is deflected downwardly into the pan through its open top 48 by the baffle 55 before the smoke passes upwardly between the baffle end 56 and partition 67 and then outwardly through the stack 50. In this manner the meat is cooked substantially uniformly on all sides without turning the meat in the pan, and in addition the meat is impregnated with the aroma of the fuel. During the time that portions of the pan 46 are passing through the cold air compartment 73 the pan is cooled by the air entering therebeneath through the flue 76 and opening 75, which air passes around said pan portions beneath the shield 78 and escapes from the casing with the products of combustion between the partition 67 and baffle end 56. It will be noted that the shaft 42 and the center of the pan 46 are disposed off center with respect to the casing 18 so that the pan extends closer to the portion of the casing wall 20 located above the cold air inlet 75 than to the casing portion 20 located above the open top 27 of the furnace, in order to prevent overheating of the pan and to position the pan so that it can be readily loaded and unloaded through the opening 66. It will also be apparent that the expanded metal sheets 33 will prevent sparks escaping from the furnace into the hot air chamber 72. During roasting or barbecuing, the valve 102 is in its open position of FIGURE 7 so that grease, meat juices and other liquids can drain from the pan through the drain ports 101. The partitions 64 and 67 also effectively function to prevent smoke escaping through the access opening 66 when the doors 87 are open. By momentarily closing the dampers 37, 52 and 79, as by manually actuating the lever arm 123, the heating chamber 72 can be filled with smoke to increase the smoke treatment of the meat.

Should the heating chamber 72 become overheated, the motor damper control 110 will be operated automatically by the thermostat 112 for exerting an upward pull on the rod 125 to rock the lever arm 123 counterclockwise about its pivot 124, as seen in FIGURE 3. This movement of the lever arm 123 will exert a downward pull on connecting rod 130 to rock the crank 134 for closing the stack damper 52. It will also release the connecting rod 127 to allow the furnace door damper 37 to move by gravity to a closed position, and will release the pull on the cable 139 so that the weight 85 can close the fresh air inlet damper 79. With the three dampers thus closed the fire in the furnace will be checked to enable cooling of the heating chamber 72. When this chamber has been cooled to a sufficient extent, the three dampers will be opened automatically by operation of the thermostat 112 and motor control 110 for rocking the arm 123 in the opposite direction or clockwise about its pivot 124. Springs 132 and 137 cushion movement of the damper 52 to a closed position and movement of damper 79 to an open position, respectively. The three dampers will also be closed automatically to smother the fire in the fire pot 28, in the same manner as previously described, should the current fail, de-energizing the motor 92, motor damper control 110 and thermostat 112.

The machine 10 can also be used for frying by merely moving the damper 59 to an open position so that the smoke can pass directly up through the baffle opening 57 to the stack 50 and without passing over the open top 48 of the pan 46. When the machine is used in this manner the valve 102 is displaced downwardly to close the drain ports 101 to retain the grease in the pan. The shield 68 in addition to directing the cold air toward the stack 50 also prevents any meat or other food particles from dropping between the casing wall 20 and pan rim 47.

The machine 10 may obviously be made in various sizes and is especially designed for commercial use by restaurants. The pan 46 is preferably of the size to accommodate approximately 175 pounds of meat, all of which can be cooked uniformly and simultaneously without replenishing the fuel in the furnace 11 and without requiring attention, due to the heat responsive automatic operation of the machine. The casing 18 may be provided with loop members 145 on opposite sides thereof by means of which the machine 10 may be lifted for moving.

Various modifications and changes are contemplated and may be resorted to, without departing from the function or scope of the invention as hereinafter defined by the appended claims.

I claim as my invention:

1. A combination cooking apparatus comprising a furnace, a casing having a portion mounted on and supported by said furnace, said casing portion constituting a heating chamber and having a bottom opening opening into the top of the furnace for receiving heat and products of combustion from said furnace, a stack communicating with the interior of said casing and extending upwardly therefrom for carrying off the products of combustion from said casing, a pan adapted to hold food items to be cooked contained within said casing, means supporting said pan for rotation within the casing, means supported by said casing and connected to the pan for revolving the pan within the casing for causing different portions of the pan to pass successively through said heating chamber and over said bottom opening during each revolution of the pan for effecting a uniform cooking of the entire contents of the pan, said casing having a portion disposed behind the furnace constituting a cold air chamber through which portions of the pan move successively during each revolution of the pan, partitions disposed within said casing separating the heating chamber from said cold air chamber, said casing bottom having an opening defining a cold air inlet opening into said cold air chamber beneath a part of the pan bottom, and a shield secured to said casing and extending into a part of the open top of the pan above said cold air inlet and cooperating with said partitions for directing the cold air from said cold air chamber to the stack.

2. A combination cooking apparatus as in claim 1, the top wall of said casing having an access opening spaced from said stack and communicating with the cold air chamber and disposed above a portion of the pan for loading and unloading the pan, and said shield being disposed beneath said access opening to prevent items from dropping between the pan and casing during loading and unloading.

3. A combination cooking apparatus as in claim 2, said stack being disposed above the furnace and remote from said cold air chamber, and a baffle extending through a part of the casing between the pan and stack and to adjacent one of said partitions for directing the smoke and heat from the furnace over and into the open top of the pan and thence upwardly between said partition and baffle to the stack.

4. A combination cooking apparatus as in claim 3, a damper contained in said stack, a damper controlling the cold air inlet, said furnace having an air inlet provided with a damper, and an electrically actuated heat responsive control connected to said dampers for effecting simultaneous closing and opening of the dampers.

5. A combination cooking apparatus as in claim 4, said baffle having an opening disposed directly beneath said stack, and a manually actuated damper controlling said baffle opening whereby the products of combustion will pass directly upwardly through the heating chamber to the stack when said last mentioned damper is in an open position.

6. A combination cooking apparatus as in claim 5, and hinged doors normally closing said access opening.

7. A combination cooking apparatus comprising a furnace, a casing having a portion mounted on and supported by said furnace, said casing portion constituting a heating chamber and having a bottom opening opening into the top of the furnace for receiving heat and products of combustion from said furnace, a stack communicating with the interior of said casing and extending upwardly therefrom for carrying off the products of combustion from said casing, a pan adapted to hold food items to be cooked contained within said casing, means supporting said pan for rotation within the casing, means supported by said casing and connected to the pan for revolving the pan within the casing for causing different portions of the pan to pass successively through said heating chamber and over said bottom opening during each revolution of the pan for effecting a uniform cooking of the entire contents of the pan, said means for revolving the pan comprising a hanger swingably suspended from the casing bottom, a motor supported by said hanger, a shaft driven by said motor and extending upwardly therefrom loosely through a part of the casing bottom, and a friction wheel fixed to said shaft and engaging the periphery of the pan, said hanger and motor being urged by gravity to swing in a direction for yieldably urging the friction wheel into contact with the pan.

8. A combination cooking apparatus comprising a furnace, a casing having a portion mounted on and supported by said furnace, said casing portion constituting a heating chamber and having a bottom opening opening into the top of the furnace for receiving heat and products of combustion from said furnace, a stack communicating with the interior of said casing and extending upwardly therefrom for carrying off the products of combustion from said casing, a pan adapted to hold food items to be cooked contained within said casing, means supporting said pan for rotation within the casing, means supported by said casing and connected to the pan for revolving the pan within the casing for causing different portions of the pan to pass successively through said heating chamber and over said bottom opening during each revolution of the pan for effecting a uniform cooking of the entire contents of the pan, said casing including a cold air compartment disposed remote from the stack and furnace, partitions contained within the casing around the pan for separating said cold air compartment from said heating chamber, and said casing bottom having a cold air inlet opening into the cold air compartment beneath a part of the pan.

9. A combination cooking apparatus as in claim 8, a baffle disposed within said casing between the stack and a part of the pan disposed therebeneath, said baffle being disposed in the heating compartment and extending to adjacent one of said partitions and being inclined downwardly and toward the cold air compartment for deflecting smoke passing upwardly and around the pan within the heating compartment downwardly and into the open top of the pan for cooking all sides of the meat uniformly and for impregnating the meat with the smoke flavor.

10. A combination cooking apparatus as in claim 9, said cold air compartment containing a shield disposed above and extending into a portion of the open top of the pan and located over said cold air inlet for cooperating with said partitions for creating a draft of cold air toward the end of said baffle located adjacent one of the partitions to prevent the smoke from entering the cold air compartment and to allow the cold air to pass to the stack from the cold air compartment.

11. A combination cooking apparatus as in claim 10, the top of said casing having an access opening located above said shield and over the part of the pan disposed in the cold air compartment for loading and unloading the pan.

References Cited in the file of this patent

UNITED STATES PATENTS

| | | |
|---|---|---|
| 1,744,189 | Williams | Jan. 21, 1930 |
| 2,591,072 | Hughes | Apr. 1, 1952 |